July 1, 1947.  H. J. NICHOLS  2,423,400
PROPELLER
Filed June 6, 1941   3 Sheets-Sheet 1

INVENTOR
H. J. Nichols,
BY
ATTORNEYS

July 1, 1947. H. J. NICHOLS 2,423,400
PROPELLER
Filed June 6, 1941 3 Sheets-Sheet 2

INVENTOR
H. J. Nichols,
BY
ATTORNEYS

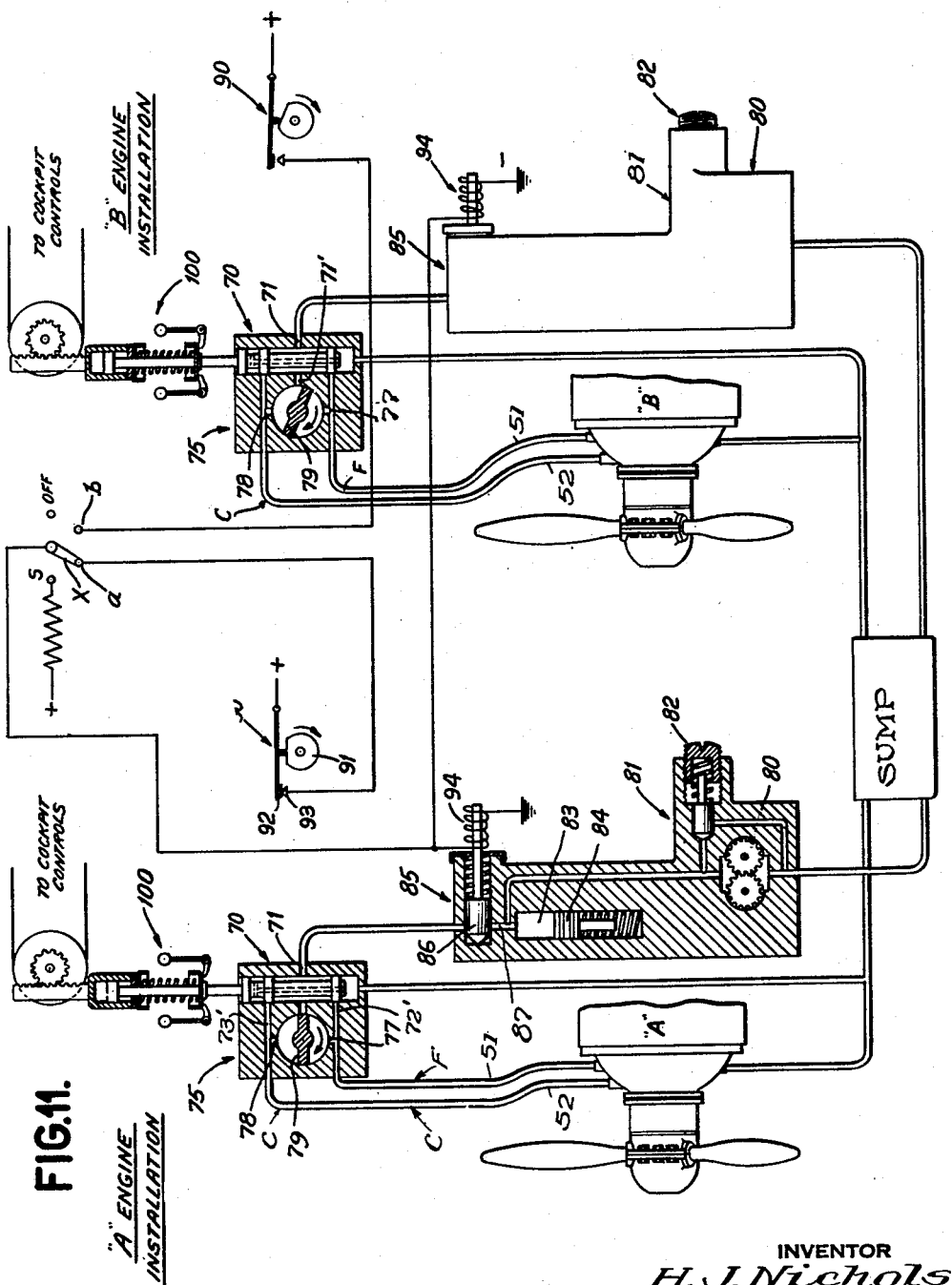

Patented July 1, 1947

2,423,400

UNITED STATES PATENT OFFICE 2,423,400

PROPELLER

Harry J. Nichols, Binghamton, N. Y.

Application June 6, 1941, Serial No. 396,936

12 Claims. (Cl. 170—163)

This invention relates to controllable pitch air propellers or air screws, as for aircraft. More particularly, it relates to self-energizing mechanism for varying the pitch of the air propeller when in motion, and a system of control of the pitch varying mechanism whereby the pitch can be regulated automatically or manually to adapt advantageously the propeller action to various operating conditions such as take-off, climb, constant-speed, feathering, air-braking, etc.

It is known of course that various types of mechanisms have been devised and used for changing the pitch of air propellers when in motion. Also control apparatus has been devised for regulating the pitch for purposes of maintaining constant-speed, feathering, and the like. Indeed, such mechanisms have virtually become an essential part of modern aircraft propelling equipment. But such mechanisms have usually been characterized by complexity, high cost, excessive weight, excessive maintenance expense, and other material limitations and objections, leaving much room for improvement by inventive methods, although the best available materials and highly refined design have already been applied to minimize existing faults.

It is accordingly a general object of the present invention to provide a system of controllable variable pitch propellers characterized by relative simplicity, durability, flexibility, smoothness of operation, and low cost, which meets in a rational and satisfactory manner the manifold practical and theoretical requirements for apparatus of this class.

A further broad object is to provide a practical controllable pitch-varying mechanism powered directly by engine power, whereby a relatively feeble control torque is greatly amplified and utilized to produce a change of pitch. As a direct consequence, the amount of power required for control purposes, and the size and weight of the pitch-varying mechanism, is greatly reduced, while the efficiency of the apparatus as a whole is greatly increased.

A further object is to provide pitch-control apparatus which is responsive to a change in speed, or in phase, or both, whereby synchronization is automatically established and maintained.

A further object is to provide pitch-varying mechanism of unlimited range, including reversing the pitch, capable of changing the pitch from fine to coarse and vice-versa in minute increments, yet also capable of changing the pitch at a rapid rate for quick feathering and reversing.

A further object is to provide pitch control apparatus which is positive but finely graduated in action. The importance of this is at once apparent from the observed fact that a change in pitch of one degree in an air propeller may alter the engine speed as much as fifty to one hundred revolutions per minute.

A further object is to provide automatic means for restricting the change of pitch to predetermined limits where such a feature is desired.

A further object is to provide a simplified form of pitch control mechanism of low cost and reliable operation, particularly adaptable to the requirements of low powered, light planes.

A further object is to provide pitch control mechanism which can be mounted on the propeller shaft without extensive modification of the normal arrangements and which dc s not interfere with the use of a hollow drive shaft intended for gun fire therethrough.

A further object is to provide a controllable pitch propeller which is substantially invulnerable to gun fire, by locating the propeller mechanism so as to be protected by normal substantial structures, and by avoiding any possibility of derangement in case a hydraulic line is punctured.

In the drawings:

Fig. 11 is a schematic diagram of a multi-engine pitch control system, including the synchronizing features.

General description

Figure 1:
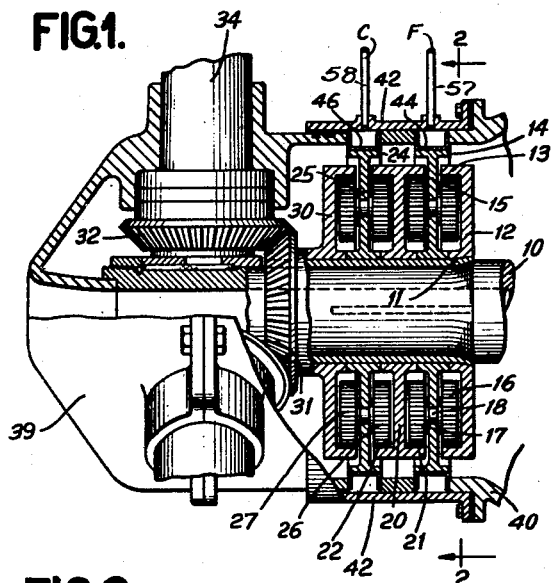
Fig. 1 is a side elevation, partly in section, of a propeller embodying certain features of the invention.

Considering the invention as a whole and referring to Fig. 1 generally, it is characterized by a unique compound epicyclic differential-gear torque-amplifier pitch-changing mechanism mounted on the propeller drive shaft 10, preferably between the engine 40 and the propeller hub 39, the entire mechanism normally rotating at shaft speed, but with the gears at rest relative to each other. By applying a braking force to retard one or the other of two revolving planet pinion carriers 15 and 25, herein termed planet carriers, a driven bevel ring gear 31 mounted rotatably on the shaft, is caused to revolve gradually in either direction with respect to the shaft. This ring gear meshes with individual bevel gears 32 fast on the shank of each rotatable blade 34, whereby the pitch of the blades is varied in accordance with the rotation of the ring gear relative to the drive shaft. The pitch changing mechanism is self-energizing (that is, it derives its power directly from the engine) and it is self-locking (that is, it cannot be driven backwards by the blade reaction). Furthermore, the blade reaction is transmitted via the pitch changing mechanism directly to the drive shaft.

The gear mechanism is normally free of external actuating connections or forces, but during pitch changing action an external braking torque is applied to retard one or the other planet carrier, thereby enabling the unique gear system of the invention to utilize the shaft torque to change the pitch of the propeller blades. The power required by the gear system varies in a wide range according to the applied braking torque, but is always comparatively low. The external control torque required is very small compared to the internal torque transmitted in pitch changing, say few percent or so. The mechanism is in this respect equivalent to a torque-amplifier or servomotor system. Consequently, the brake apparatus can be relatively light and weak, and in most instances the engine oil pressure will suffice to operate the brakes. It will be apparent that the above characteristics contribute importantly to practical considerations of favorable size, weight, wear, maintenance, long-life, low-cost, etc.

While the external braking force requisite for controlling the pitch changing action could be applied by mechanical, electrical, pneumatic or hydraulic media, the latter type is preferred, mainly because of its prevalence on existing installations, and is used for illustrative purposes in the following description. It is to be understood, however, that since alternative types of braking systems are well established, the present invention is not restricted to a particular type of braking apparatus.

Similarly, a hydraulic type of system has been chosen for illustrating the control of the pitch changing mechanism, but an electrical or servo type of control system can be employed, and a typical electrical hydraulic control system is shown in one embodiment.

The degree of pitch change depends on the relative position of the ring gear on the shaft, and since the construction is such that the ring gear can turn indefinitely in either direction, the theoretical range of the pitch changing gear is unlimited. In practice, it is generally considered advisable to limit the working range, and accordingly means are provided for doing this if desired, and in the degree desired.

In customary terms of propeller performance features, the invention provides manual selective pitch control, constant-speed control, full-feathering, reverse-pitch operation, and synchronized control features. No auxiliary electrical or hydraulic booster equipment is necessary for fast feathering action.

The speed, capacity, and adaptability are adequate to suit any power, speed, performance feature, blade construction, or other probable propeller design requirements. The propeller shaft can be hollow, permitting gun fire therethrough, which feature is highly desirable on some military planes.

Pitch changing mechanism

Figure 2:
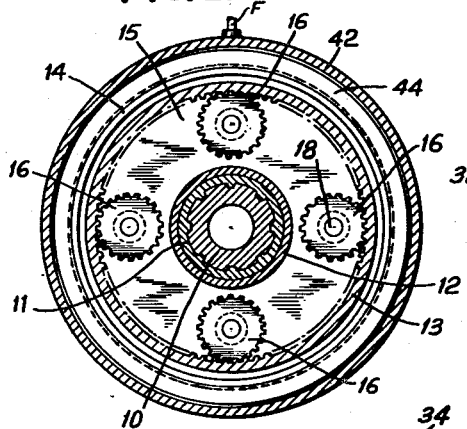
Fig. 2 is a cross section on line 2—2 of Fig. 1, through the epicyclic mechanism showing the gear relationships.

Referring now to the drawings in detail and particularly to Figs. 1 and 2, beginning at the engine end of the propeller apparatus, the pitch changing mechanism comprises first the hollow propeller shaft 10 from whose torque the pitch changing power is derived; the epicyclic, geartrain mounted concentrically on the fixed shaft sleeve 11 (which commences with the driver gear 12, fixed on the sleeve 11, and terminates with the driven gear 30, loose on sleeve 11); and the bevel ring gear 31, fast to gear 30, which meshes with the blade bevel gears 32 to turn the blades 34 axially, thereby changing their pitch.

Considering the gearing more in detail, the two epicyclic trains thereof are mounted in tandem as a unit on the shaft sleeve 11, the latter splined on the propeller shaft 10 as indicated in Fig. 2. The drive or first orbit gear 12 of the first epicyclic train is mounted fixed on the sleeve 11, by brazing or the like, and is provided with internal teeth cut in the inner rim 13. The next member of the train is the first planet carrier 15, loose on sleeve 11 and provided with a rim brake-drum 14. The brake-drum can be engaged by a hydraulic band-brake 44 mounted internally in the drum 42 secured to the engine housing 40 but acting externally on rim 14. The carrier 15 also mounts a plurality of paired double planet pinions 16—17, each tight on pinion shaft 18 rotatably journalled in carrier 15, each pair mounted to mesh properly with the preceding and following internal orbit gears. (See Fig. 2.)

Figure 3:
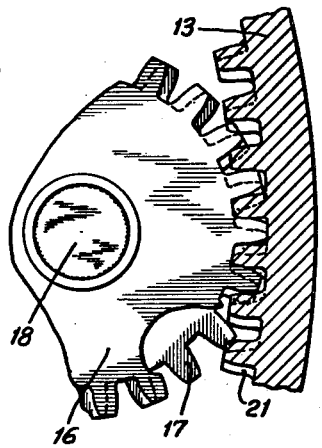
Fig. 3 is a fragmentary view showing the skew arrangement of the tandem pinions of the epicyclic gears.

Each internal orbit gear has a slightly different number of teeth than the neighboring internal gear meshing with the same pinions. That is, there is a slight difference in the gear ratios of successive pairs of mating gears and pinions. Hence in order for all pinions to mate smoothly with their internal gears, the pinions of the successive pairs have their teeth displaced in phase (skewed) by a fraction of a tooth pitch relative to each other. (See Fig. 3.) Hence in action the multiple pinions meshing with each gear operate in various stages of tooth engagement, assuring smooth tooth action.

The next member of the train is the intermediate or second orbit gear 20, loose on sleeve 11, and provided with a double, separated row of internal teeth 21 and 22. The number of teeth in these gears is preferably the same, but is slightly different from that of the first and third internal orbit gears, which preferably should have the same number of teeth. The intermediate gear acts as a coupling between the two epicyclic gear trains.

The next member of the train is the second planet carrier 25, loose on sleeve 11 and exactly similar to the first carrier 15 except for its position in the gear train. The brake rim 24 can be engaged by a hydraulic band brake 46, mounted on drum 42. The second carrier is also provided with paired pinions 26—27 identical in construction with those mounted on the first carrier.

The final member of the gear train is an internal driven orbit gear 30, called the third gear, loose on sleeve 11 and similar to the first orbit gear 12 except that it faces oppositely and is integral with or fixed to the bevel ring gear 31.

The two differential gear trains, forming the two sections of the gearing, have speed reducing ratios of contrary or opposite algebraic sign. That is, input torque in one rotary direction produces output torques in opposite rotary directions in the two trains.

The operation and principle of the epicyclic gear train is as follows: Normally, the gears and the carrier all rotate with the shaft, being stationary with respect to the shaft and to each other. The blades are held against twisting (which they naturally tend to do) because the ring gear is fast to the final internal orbit gear 30, the first internal orbit gear 12 and sleeve 11 are fast on the shaft, and the multiple pinions lock the internal gears together. So far as adjacent internal gears are concerned, their torque tends to shear off the mating teeth of the pinions rather than to rotate the pinions. Hence the gear system is normally irreversible and positively locked against being driven from the normally driven end of the gear system. However, upon rotation of either of the planet carriers relative to the shaft, the pinions are permitted to planetate, resulting in a differential rotation of the co-acting orbit gears. In actual operation, the carriers are normally rotating with the shaft and there is no rotation relative thereto. But upon retardation or stoppage of either carrier (or relative rotation otherwise), the orbit gear of the pair co-acting with the planet pinions carried thereby and located towards the shaft end becomes the driving member of the gear train, while the orbit gear located towards the blade end becomes the driven member of the gear train. Hence it is evident that the gear train functions by orbital drive in actual operation, but only when the planet carriers are given relative rotation. Consequently, it is apparent that in operation the driving torque for changing the blade pitch is derived from the shaft torque, the gear train functions by orbital drive, the carriers actuate the gear train, and the brakes control the carriers.

Assume now that a braking force is gradually applied by the band brake 44 to the rim 14 of the first carrier 15 sufficient to cause it to slow down its rotation. As soon as a moderate braking force (somewhat more than the static gear friction) is applied to the disc 15, the planet pinions mounted thereon begin to rotate, rolling around in the two adjacent internal gears in squirrel-cage fashion, thereby enabling the carrier to revolve relative to the adjacent internal gears. Due to the fact that there is a slight difference in the tooth pitches of successive gears and pinions, and the compounding effect of the gear train, a slight differential angular displacement of the first and second gears occurs as the pinions continue to roll. As a typical example, and to evaluate the differential action, assume that the first gear 13 has 102 teeth, the second gear 20 107 teeth, the first pinion 16 20 teeth, and the second pinion 17 21 teeth. (The gears should be cut to approximately the same pitch circle.) Then when the first epicyclic disc has lost one revolution relative to the first gear, the differential angle between the first and second gears will amount to $(102 \times 21/20 - 107) \times 360°/107 = (107.1 - 107) \times 360°/107 = +.33°$ approximately.

This is because the first pinion will have meshed with 102 teeth of the first gear 13, and the second pinion 17 with 107.1 teeth of the second gear 20, the latter thereby gaining 1/10 tooth pitch (equals $360°/107$) relative to the first gear, or a lead of $\frac{1}{3}°$ approximately.

Had the applied braking force completely stopped the carrier, the differential action per revolution of the shaft would be as above, which is therefore a maximum figure for differential rate of change. Ordinarily, the braking force would be adjusted to merely retard the carrier, rather than to stop it. Assume therefore that the braking effect amounts to $\frac{1}{10}$ turn of the carrier per revolution of the shaft. Then the differential action would be $\frac{1}{30}°$ per revolution, which is obviously a micrometric change.

In the case first assumed, the power ratio would be approximately 1:1,100, and in the second 1:11,000. The braking torque on the carrier bears theoretically the same ratio to the load torque (neglecting frictional resistance). Hence it is at once apparent that the braking force need only be a few percent or so of the force being controlled to start the epicyclic gears in motion and to change the pitch of the blades. Therefore, the epicyclic mechanism is a torque amplifier in which the braking torque is greatly amplified for application to the blade.

The efficiency of an internal epicyclic gear, as here described, is well established, and because of the multiple pinions, smooth tooth action is assured. Hence the theoretical advantages of the epicyclic gear system described can be realized most satisfactorily in practice.

Assuming now that the differential gear action just described were transmitted through the remaining locked portion of the gear train, the master bevel gear, and the blade gears to make the propeller pitch more fine, let us now consider the gear action to make it more coarse. For such purpose, braking force is applied by band brakes 46 to the second carrier 25 (the first epicyclic disc having been freed to resume rotation with the shaft when the desired fine pitch was attained). As before, when moderate braking force is applied to the second carrier the pinions carried thereby begin to roll around in the adjacent gears, and differential action ensues. To evaluate the differential action, assume as before that the second or intermediate gear has 107 teeth, and third or final gear has 102 teeth, and the corresponding pinions 21 and 20 teeth respectively, this being the reverse of the first epicyclic system. Then when the second carrier has lost one revolution relative to the second gear, the differential angle between the second and third gears will amount to $(107 \times 20/21 - 102) \times 360°/102 =$
$(101.9 - 102) \times 360°/102 = -.35°$ This is because the pinions will mesh with 107 teeth of the second and 101.9 teeth of the third gear, the latter thereby losing 1/10 tooth pitch (equals $360°/102$) relative to the second gear, developing a lag of $.35°$.

It will be noted that one of the epicyclic trains has a positive ratio while the other has a negative ratio. This contrary ratio is of course essential to obtaining a contrary change of pitch when one or the other train is energized.

As before, had the braking force stopped the carrier, the differential action would be .35° per revolution as a maximum, and the speed ratio 1,100:1 as a minimum. Ordinarily, the braking force would merely retard the carrier, and the differential action and speed ratio would be correspondingly altered. Thus it is apparent that in both cases, whether the pitch is fined or coarsened, the rate of pitch change can be regulated by the applied braking force. Hence for fast feathering action it is only necessary to increase the braking action and vice-versa, providing great flexibility as to pitch changing rates. It should also be noted that pitch changes in both directions are accomplished merely by slowing down the carriers, without reversal of the direction of rotation of the gear train. Hence there is no back-lash effect, and the gears can be cut for easy running without impairing the accuracy of pitch adjustment. These features are unique to this invention and contribute importantly to its practicality.

Pitch block feature

Figure 5:
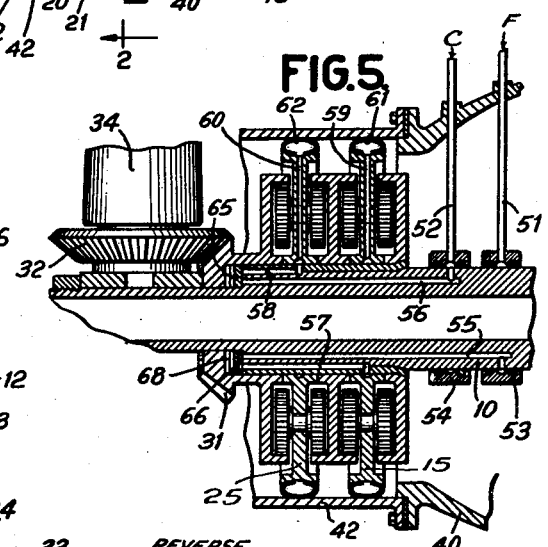
Fig. 5 is an axial section similar to Fig. 1 of another embodiment of the invention, showing the pitch-block valve arrangement.
Figure 4:
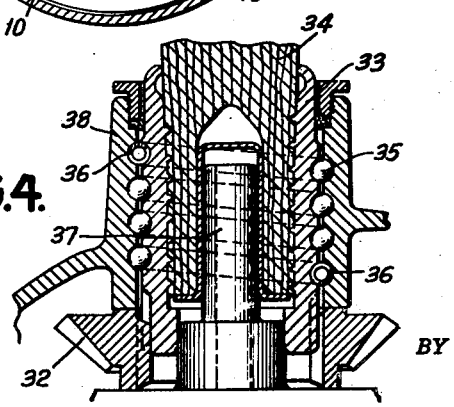
Fig. 4 is an enlarged axial section through a blade mounting showing a preferred combination blade bearing and twist-compensating construction.
Figure 6:
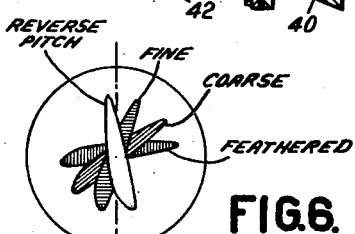
Fig. 6 is a diagram illustrating typical stations of propeller pitch such as reverse pitch, full feathered, etc.

Referring now to Fig. 5, the pitch changing mechanism there shown is generally the same as that shown in Fig. 1, but is provided with an additional feature for limiting the degree of pitch change, commonly called a pitch block. The purpose of the pitch block is to limit the normal range of pitch variation to a predetermined working arc as, for example, between the stations marked "Fine" and "Coarse" in Fig. 6. Naturally, some changes in design are necessary to incorporate this feature. In the embodiment now to be described, the pitch limiting function is accomplished by means of a ring valve 65 encircling the shaft and actuated by the power gear 31 so as to cut off the supply of brake fluid to one or the other of the epicyclic brakes when the propeller pitch is turned beyond a predetermined range. (See Fig. 7 for a schematic showing of the principle of operation of the pitch block valve.)

Referring to Fig. 5, in order to bring the brake fluid to the pitch block valve, the hydraulic channels are lead to the brakes internally rather than externally, as in the prior embodiment. The hydraulic supply passes via tubings 51 and 52 to the oil transfer rings 53 and 54, and thence to axial channels 55 and 56 leading to the pitch block valve. From the valve ports, the fluid is lead back via axial channels 57 and 58 and radial ducts 59 and 60 to internal brakes 61 and 62 respectively. The preferred form of internal brakes for this embodiment are closed annular metal rings of elliptical section and strongly secured to the rim of the epicyclic discs 15 and 25 respectively, as for example by silver soldering. These rings are caused to expand and grip the housing 42 when supplied with fluid under pressure, but immediately on release of the pressure, they spring back to normal shape and size, quickly separating the braking surfaces. Quick brake-action is desirable for close control of the pitch.

The pitch block valve itself comprises ring valve 65 mounted between bevel gear 31 and the end of shaft sleeve 11 in such manner as to pass over the ports 55—57 and 56—58. The ring valve is spring loaded against the ports by spring washer 68. The ring 65 is cut away along certain arcs, to form arcuate port slots 66 (see Fig. 7) and is secured to the bevel gear 31 so as to rotate therewith.

When the arcuate port slots move beyond the predetermined range, the flow of liquid in the brake supply channels is normally severed at the ports as described. But for full-feathering operation, or other abnormal or emergency purpose in which an abnormal pitch range is required after cut-off by ring 65, fluid can be forced through the fine ports 55—57 or coarse ports 56—58 by applying high or "boost" pressure to the corresponding brake fluid supply. This abnormal pressure forces the ring 65 back against the pressure of spring washer 68 sufficiently to allow leakage of brake fluid into the proper return channel and thence to the associated brake. A relief port 67 in the valve ring vents the fluid to outside the normal channels to prevent further braking action when the desired full-feathered pitch position is attained. (See Figs. 6 and 7.) As before, the pitch can be reversed from any abnormal pitch position, by applying fluid pressure to the proper braking system.

Pitch blocking by disabling the brakes hydraulically is considered preferable to mechanical blocking because of the great power of the epicyclic gear system, which might strip gears or the like if mechanically blocked, or else the brakes might be harmed by overloading. The present arrangement avoids any danger of harm to the pitch changing mechanism or brakes, and allows the pitch to be brought to the predetermined limits without danger of jambing. Also, in an emergency the predetermined limits can be exceeded and returned to thereafter without any readjustment, all as described.

Pitch control system

Figure 7:
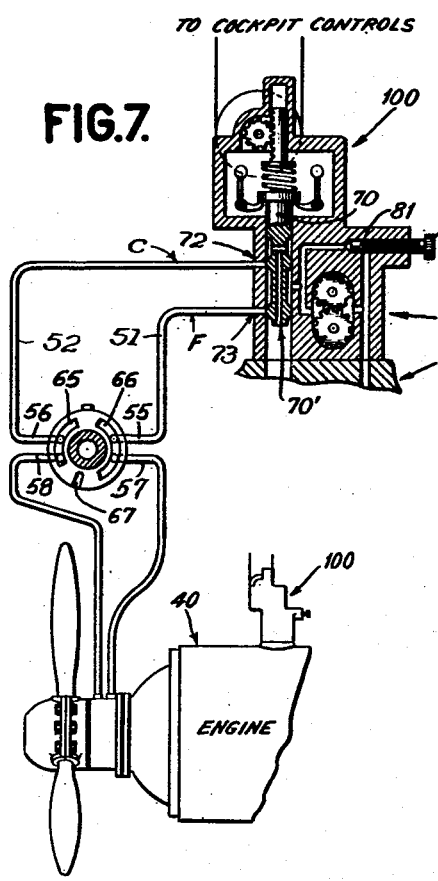
Fig. 7 is a schematic diagram of a typical single-engine pitch control system embodying the pitch-block valve.
Figure 8:
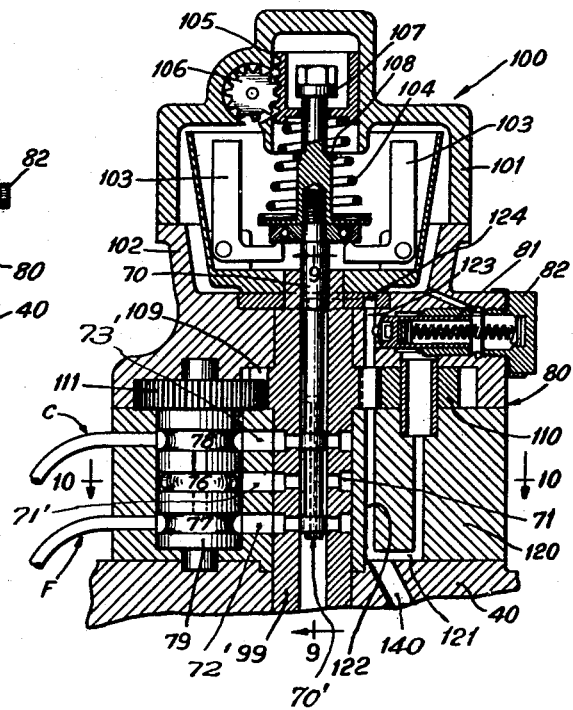
Fig. 8 is an axial section of a governor and synchronizer embodying parts of the invention.
Figure 9:
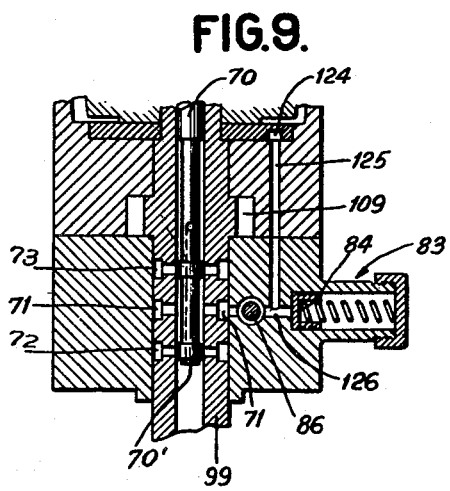
Fig. 9 is a part axial section of the governor of Fig. 8, but taken at right angles thereto.
Figure 10:
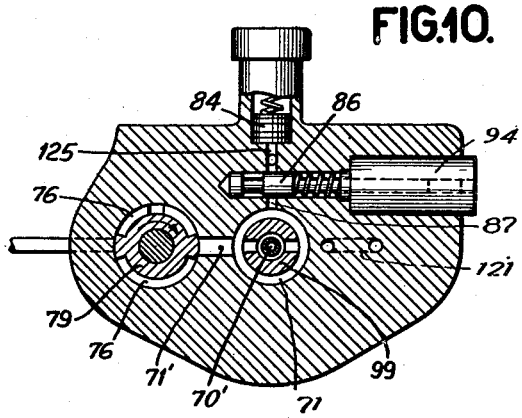
Fig. 10 is a part section, on line 10—10, of Fig. 8.

Referring now to Fig. 7, the diagram there shown is a schematic representation of an elementary, single-engine pitch-control system illustrative of the invention. The pitch-block valve 65 is shown schematically and as an external unit in order to show clearly its principle of operation. The essential elements of the control system are a source of control power, shown as a fluid pump 80 (although the engine oil-pressure system can be utilized), and means, such as the pitch selector valve 70, shown actuated by a schematic speed-governor 100, for applying the control power alternately to the epicyclic brakes. For brevity, the brake, ports, etc., which cause the pitch to become more fine will be referred to as the F— brake, etc., while similar elements haviing a coarse effect will be called the C— brake, etc. The neutral position in which the pitch is static will be referred to as the N— position. The speed governor, of well known type, is assumed to be equipped for cock-pit control to enable the pilot to set the speed at any desired level in the same well known manner as the engine throttle. Furthermore, the pilot can manipulate the governor cock-pit control to move the valve arbitrarily to either the C— or F— position at will.

The operation of the single-engine control system is as follows: The propeller and the planet carriers, as in Figs. 1 and 5, are assumed to be in rotation. The fluid pump 80 is assumed to be delivering a fluid pressure, regulated by the pressure relief valve 81, but the selector valve 70. of balanced piston type, is in the neutral or N— position, hence no fluid can reach the brakes and therefore the epicyclic brake system is inactive. Now to make the pitch more fine, the stem of the valve piston 70 is pushed downwardly toward the F— position. Thereupon the center port 71 is connected to the F— port and fluid flows to the F— brake, actuating the same to cause the pitch-changing mechanism to fine the pitch as previously described. When the pitch is fined to the extent desired (made evident in practice by the increase in engine speed), the valve piston 70 is returned to neutral or N— position as shown. Due to internal leakage, as for example at the pitch block valve, with the valve in the N— position, the fluid pressure at the F— brake is soon relieved. Or, if the valve piston is pulled momentarily up to the C— position, the fluid pressure in the F— system will be instantly relieved by the drainage of fluid via the axial vent 70′ in the valve piston 73, and thence eventually to the sump and the suction side of the pump 80.

To make the pitch of the propeller more coarse, the piston 72 is pulled upwardly to the C— position, whereupon the fluid flows via the C— port to the C— brake, etc. in similar manner as before described, but the pitch is coarsened causing the engine to slow down. As before, the fluid pressure in the C— system can be drained to the suction side of the pump by moving the piston momentarily to the F— position.

It should be noted that the brake control system is designed to be quick acting, that the character and degree of pitch change is a reflection of the actuation of the selector valve, and that a relatively small amount of fluid suffices to actuate the braking mechanism. Except for leakage and minor drainage, there would not be a net flow of fluid to effect a pitch change.

Special operating conditions

For constant-speed operation, the pilot sets the engine throttle (not shown) and the controls of governor 100 in the cock-pit at the calibrated settings in customary manner. Thereupon, the throttle regulates the fuel supply to the engine, and the governor 100, driven by the engine in a manner not shown, actuates the valve 70 to cause the pitch-changing mechanism to vary the propeller pitch as required to maintain the set speed under various operating conditions.

For full-feathering or reversing pitch, after fluid cut-off at the pitch block valve 65 or for quick feathering at any time, the fluid pressure can be "boosted" by increasing the tension on the spring of the pressure valve, such as screwing in adjusting screw 81, or by means alternative thereto, whereupon the brakes are actuated via valve 70 to adjust the pitch at maximum rate as desired. When going to reverse pitch, or returning therefrom, the engine throttle should be closed momentarily to avoid over-speeding the engine while reversing pitch. However, because of the quick feathering feature which enables the pitch to be reversed in two or three seconds, dangerous over-speeding cannot occur even in case the pilot neglects to close the throttle.

Without further explanation or discussion, it is believed that the foregoing conveys a good understanding of the manifold novel features and advantages characterizing the invention. These features and advantages cooperate harmoniously with the essential considerations in propeller construction to provide a light weight, reliable, compact, efficient, inexpensive and relatively simple controllable-pitch propeller organization.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention and therefore such adaptations should and are intended to be comprehended within the meaning and range of equivalency of the following claims.

I claim:

1. In a variable pitch propeller having a drive shaft and blades rotatable about their axes to vary the pitch, means for so rotating said blades including a differential-gear system in two sections for selectively varying the pitch in either direction, the first section including a first internal gear mounted on the propeller drive shaft and driven thereby, a second internal gear mounted loose on said shaft, and a first epicyclic member mounted loose on said shaft between the first and second gears and carrying compound pinions adapted to coact with said adjacent gears for producing differential action therebetween; and the second section including an intermediate internal gear integral with or rotating with the aforesaid second gear, a third internal gear loose on said shaft associated with means for rotating the blades, and a second epicyclic member mounted loose on said shaft between the intermediate and third gears and carrying compound pinions adapted to coact with said adjacent gears for producing reverse differential action therebetween.

2. In blade pitch-changing gear mechanism mounted on a drive shaft, a pitch changing epicyclic gear unit mounted on said drive shaft, hydraulic brake means for said unit mounted on said shaft, hydraulic valve means actuated by said unit for limiting the pitch change to a normal range by disabling said hydraulic brake means, and hydraulically actuated means for nullifying said pitch limiting means.

3. In combination with a controllable pitch propeller having a normal range of pitch adjustment, torque amplifying epicyclic gear means for changing the pitch of said propeller, and means for controlling said gear means including a source of pressure fluid, hydraulic braking means actuated thereby for braking said gear means, rotary hydraulic valve means actuated by said gear means for normally permitting the flow of fluid to said hydraulic means and for stopping said flow at predetermined normal pitch limits, and means for raising the pressure of the fluid to re-establish flow of fluid at said rotary valve to said hydraulic means for purposes of extending the normal pitch limits.

4. In a pitch limiting hydraulic valve for a controllable pitch propeller, a rotary gear member operatively associated with varying the blade pitch, and a rotary hydraulic valve member actuated by said gear member and provided with ports for permitting the flow of pressure fluid in normal channels within a normal pitch limit and an auxiliary port for permitting the escape of pressure fluid from the normal channels at a predetermined abnormal pitch limit.

5. In combination with a propeller having pitch adjustable blades, means for adjusting the pitch of said blades including a shaft for rotating the propeller, a pair of hydraulic brakes, torque-amplifying gear means mounted on and energized by said shaft in conjunction with said brakes, fluid pressure means for actuating said hydraulic brakes, speed control means regulating the flow of fluid from said pressure means to said brakes, fluid valve means intermediate said speed-control means and said fluid pressure means and actuated by said gear means for limiting the normal range of pitch adjustment, and means for regulating the fluid pressure means to raise the fluid pressure for the purpose of nullifying the action of the fluid valve.

6. In combination with a controlled pitch propeller, blade control means including a shaft for rotating said propeller and torque means for adjusting the pitch of said blade including said shaft for rotating said propeller and torque amplifying gear means comprising two epicyclic gear trains of contrary ratio carried by said shaft and energized thereby, hydraulic brakes for actuating said gear means to adjust the pitch of said propeller, speed governor control means for actuating said hydraulic brakes and rotary valve means mounted concentrically on said shaft and actuated by said gear means for altering the flow of fluid to limit the pitch adjustment.

7. In a variable pitch propeller of the type which is mounted on a drive shaft and has a hub, and blades with rigid individual bevel gears mounted in said hub for rotation about their axes to vary the pitch, and a master bevel gear mounted rotatably on said drive shaft and meshing in driving relation with said individual bevel gears; torque-amplifying gearing mounted entirely on said drive shaft in driven relation with respect to said drive shaft and driving relation with respect to said master bevel gear for transmitting power from said drive shaft to said master bevel gear, said torque-amplifying gearing comprising a pair of irreversible differential gear trains of contrary ratio mounted in tandem on said drive shaft and mechanically connected in series, and a pair of independently rotatable planet carriers rotatably mounted on said drive shaft and operatively connected respectively to said differential gear train; and braking mechanism for selectively retarding said planet carriers relative to said drive shaft thereby to vary the pitch of said blades.

8. In a variable pitch propeller having a drive shaft and blades rotatable about their axes to vary the pitch, means for so rotating said blades including an irreversible differential-gear system in two sections for selectively varying the pitch in either direction, the first section including a first gear mounted on the propeller drive shaft and driven thereby, a second gear mounted loose on said shaft, and a first epicyclic member mounted loose on said shaft between the first and second gears and carrying planet pinions adapted to coact with said adjacent gears for producing differential action therebetween; and the second section including an intermediate gear connected to rotate with the aforesaid second gear, a third gear loose on said shaft operatively associated with means for rotating the blades, and a second epicyclic member mounted loose on said shaft between the intermediate and third gears and carrying planet pinions adapted to coact with said adjacent gears for producing reverse differential action between said adjacent gears.

9. In a variable pitch propeller mounted on a drive shaft and having blades rotatable about their axes to vary the pitch; means for so rotating said blades including torque-amplifying gearing mounted entirely on said shaft and connected in driven relation with respect to said shaft and driving relation with respect to said blades for transmitting blade rotating power from said shaft to said blades, said torque-amplifying gearing comprising two self-locking differential gear trains of contrary ratio mechanically connected in series, the first train including a first gear fixed with respect to said drive shaft, a second gear nearly equal in number of teeth to said first gear loose on said shaft, and a first epicyclic member mounted loose on said shaft between said first and second gears and carrying double pinions adapted to coact with said adjacent gears for producing differential rotation between said adjacent gears; and the second train including an intermediate gear mechanically connected to the aforesaid second gear, a third gear nearly equal in number of teeth to said intermediate gear loose on said shaft operatively connected with means for rotating the blades, and a second epicyclic member mounted loose on said shaft between the intermediate and third gears and carrying double pinions adapted to coact with said adjacent gears for producing reverse differential rotation between said adjacent gears.

10. In a variable pitch propeller having a drive shaft, and blades rotatable about their axes to vary their pitch, gearing for so rotating said blades mounted entirely on said drive shaft including a self-locking differential gear system in two sections having gear ratios of opposite algebraic signs for selectively varying the pitch in either direction, the first section comprising a differential gear train of the type wherein rotary motion is transmitted only in the normal driving direction, said gear train including a first driving gear fixed on said drive shaft, a first driven gear nearly equal in number of teeth to the first driving gear mounted loose on said shaft, and a first epicyclic member mounted loose on said shaft and carrying planet pinions meshing with said first driving and driven gears for coupling these gears and for producing differential rotation between said adjacent gears; and the second section comprising a differential gear train likewise of the type wherein rotary motion is transmitted only in the normal driving direction and including a second driving gear loose on said shaft and operatively connected to rotate with the first driven gear, a second driven gear nearly equal in number of teeth to the second driving gear mounted loose on said shaft and operatively connected with means for rotating the blades, and a second epicyclic member mounted loose on said shaft and carrying planet pinions meshing with the second driving gear and second driven gear for coupling these gears and for producing reverse differential rotation between said adjacent gears.

11. In a variable pitch propeller having a drive shaft and blades rotatable about their axes to vary their pitch, in combination, means for so rotating said blades comprising gear means individual to each blade, a master gear mounted rotatably on said shaft and meshing in driving relation with said individual gear means, and a torque-amplifying epicylic gear system in two sections for selectively varying the pitch in either direction, the first section including an irreversible differential gear train mounted entirely on said drive shaft and driven thereby, the second section including a second irreversible differential gear train of contrary ratio to the first differential gear train mounted entirely on the drive shaft in driven relation to said first section and in driving relation to said master gear; braking means for controlling said epicyclic gear system; and means actuated by said master gear for disabling said means for controlling the epicyclic gear system in correlation with a predetermined variation in pitch.

12. In combination with a controllable pitch propeller mounted on a drive shaft and having a normal range of pitch adjustment; a master gear drivably connected to said propeller and mounted loosely on said shaft, torque-amplifying differential gearing mounted entirely on said drive shaft for rotating said master gear, means for controlling said differential gearing including a pair of independently rotatable planet carriers loosely mounted on said drive shaft, and pitch limit means mounted on said drive shaft and actuated by said master gear for preventing rotation of one or the other of said planet carriers relative to said drive shaft at predetermined normal pitch limits.

HARRY J. NICHOLS.

REFERENCES CITED

The following references are of record in the file of this patent:

UNITED STATES PATENTS

| Number | Name | Date |
|---|---|---|
| 2,223,081 | Thomas | Nov. 26, 1940 |
| 2,248,590 | Smith | July 8, 1941 |
| 1,776,650 | Carter | Sept. 23, 1930 |
| 1,875,598 | Heath | Sept. 6, 1932 |
| 2,007,417 | Aivaz | July 9, 1935 |
| 2,144,429 | Martin | Jan. 17, 1939 |
| 2,217,856 | Brady | Oct. 15, 1940 |
| 2,224,177 | Algarsson | Dec. 10, 1940 |
| 2,260,469 | Martin | Oct. 28, 1941 |
| 2,261,145 | Dickey | Nov. 4, 1941 |
| 1,921,942 | Ratier | Aug. 8, 1933 |
| 1,892,187 | Drennon | Dec. 27, 1932 |
| 1,990,814 | Castro | Feb. 12, 1935 |
| 2,160,025 | Martin | May 30, 1939 |
| 2,174,717 | Caldwell et al. | Oct. 3, 1939 |
| 2,280,713 | Martin et al. | Apr. 21, 1942 |
| 2,108,660 | Farrell | Feb. 15, 1938 |
| 2,138,339 | Chauviere | Nov. 29, 1938 |
| 1,874,714 | Sperry | Aug. 31, 1932 |
| 1,864,102 | Wishon | June 26, 1934 |
| 2,161,917 | Forsyth et al. | June 13, 1939 |
| 2,307,849 | Mullen | Jan. 12, 1943 |
| 697,153 | Madan | Apr. 8, 1902 |
| 559,784 | Munden | May 5, 1896 |
| 1,998,891 | Benson | Apr. 23, 1935 |
| 2,284,154 | Lampton | May 26, 1942 |
| 1,980,249 | Bates | Nov. 13, 1928 |

FOREIGN PATENTS

| Number | Country | Date |
|---|---|---|
| 445,652 | France | Apr. 16, 1936 |
| 499,223 | Great Britain | Jan. 20, 1939 |
| 499,634 | Great Britain | Jan. 26, 1939 |
| 295,813 | Great Britain | Aug. 23, 1928 |
| 230,162 | Great Britain | Mar. 3, 1925 |
| 615,670 | France | Jan. 13, 1927 |
| 499,223 | Great Britain | Jan. 20, 1939 |
| 434,567 | Great Britain | Sept. 4, 1935 |
| 772,748 | France | Nov. 5, 1934 |
| 541,960 | Germany | Apr. 1, 1932 |